E. F. OVERTON.
APPARATUS FOR TREATING SEWAGE.
APPLICATION FILED JULY 28, 1920.

1,401,182.

Patented Dec. 27, 1921.
2 SHEETS—SHEET 1.

Inventor
Edward F. Overton
by Guyer & Popp
Attorneys

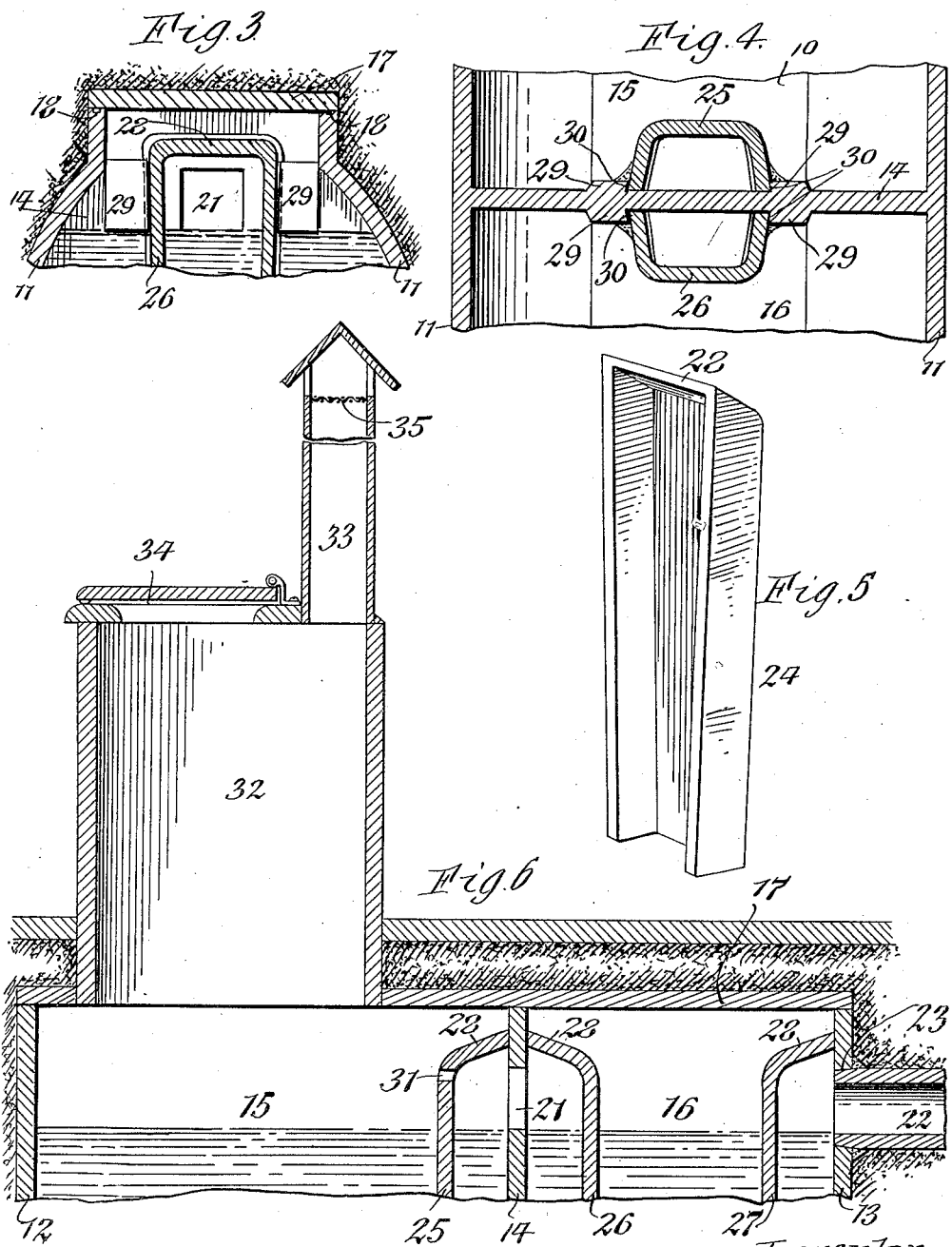

UNITED STATES PATENT OFFICE.

EDWARD F. OVERTON, OF BUFFALO, NEW YORK.

APPARATUS FOR TREATING SEWAGE.

1,401,182.   Specification of Letters Patent.   Patented Dec. 27, 1921.

Application filed July 28, 1920. Serial No. 399,498.

*To all whom it may concern:*

Be it known that I, EDWARD F. OVERTON, a citizen of the United States, residing at Buffalo, in the county of Erie and State of New York, have invented new and useful Improvements in Apparatus for Treating Sewage, of which the following is a specification.

This invention relates to an apparatus for the treatment and disposal of sewage coming from various sources, as for instance, from the bath rooms, kitchens and closets of dwellings which are usually supplied with running water and the closets and toilet rooms of country schools and public buildings which are only supplied with water periodically by rain or otherwise.

It is well known that two kinds of organisms are developed in raw sewage, one being the harmless or friendly kind known as anaerobic bacteria and the other being the unfriendly or enemy kind which are generally known as disease germs owing to their deadly and poisonous character. The latter, which multiply very rapidly, are constantly forced to fight for their existence with the harmless bacteria and also to struggle for light and air, inasmuch as both are necessary to keep the harmful bacteria alive. The harmless bacteria on the contrary, however, will thrive in the absence of air and light, so that the conditions favorable to the existence of one of these bacteria are unfavorable to the other.

It is the object of this invention to provide an apparatus of simple, efficient, durable and inexpensive construction in which the sewage is first permitted to develop until all of the solid matter therein has been reduced to a liquid state by the action of the harmful bacteria in the presence of air and more or less light, after which the liquefied sewage laden with disease germs is confined temporarily in a chamber from which light and air are excluded and thus cause these germs to die and become inert, so that the sewage is neutralized and may then be carried away into the soil or used for sub-irrigation.

Figure 1:
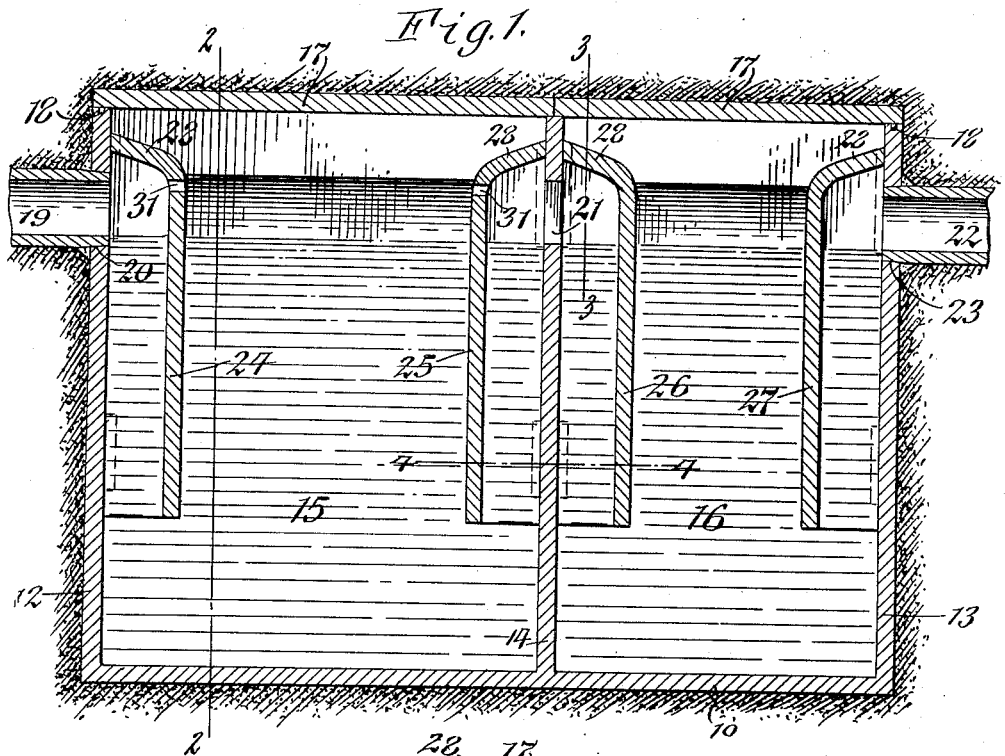
Figure 2:
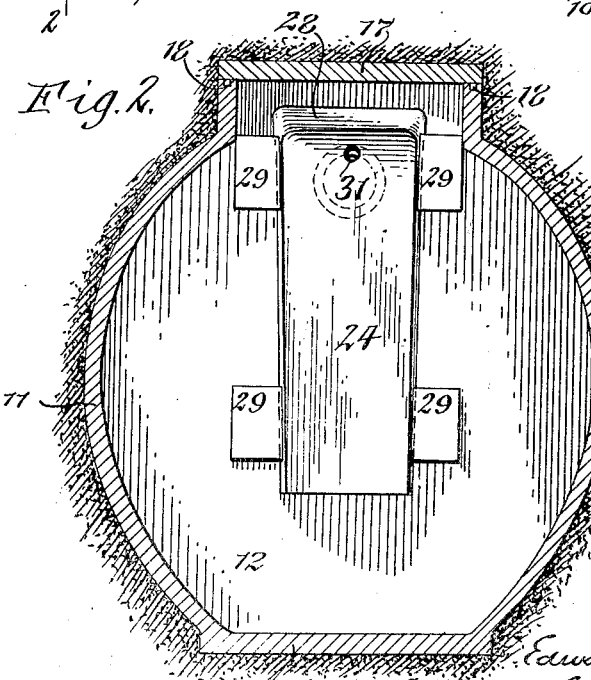

In the accompanying drawings:

Figure 1 is a vertical longitudinal section of a sewage treating apparatus embodying my invention. Fig. 2 is a cross section thereon on line 2—2, Fig. 1. Fig. 3 is a fragmentary vertical cross section of the same, taken on line 3—3, Fig. 1. Fig. 4 is a horizontal section on line 4—4, Fig. 2. Fig. 5 is a perspective view of one of the traps used in this apparatus. Fig. 6 is a fragmentary vertical longitudinal section of my invention, showing the same organized for use in a country school house or similar building in which running water is not available.

Similar characters of reference indicate corresponding parts throughout the several views.

The construction of my apparatus shown in Figs. 1–5 is designed more particularly for use in connection with country houses, dwellings or buildings from which the sewage is discharged with an admixture of water such as the sewage coming from the bath rooms, toilets and kitchen sinks. In this case the body of the apparatus comprises a flat horizontal bottom 10, two outwardly curved longitudinal side walls 11, two vertical transverse end walls 12, 13 connecting the front and rear ends of the bottom and side walls, and an upright intermediate wall or partition 14 connecting the bottom and side walls and forming a front sludge or inlet chamber 15 and a rear effluent or outlet chamber 16. These several parts are constructed integrally of concrete, properly reinforced with metal wire embedded therein, so as to increase the strength thereof and prevent breakage during transportation and installation and when in use. The body when thus constructed is uncovered at the top so that the upper ends of the sludge and effluent chambers are open but when in use these chambers are closed at the top by a concrete plate 17 which may be made either in sections or in one piece and connected with the upper edge of the body so that the joint between the same is practically air and water tight, this being preferably accomplished by providing the upper edges of the body with grooves 18 into which green cement is poured.

The raw sewage to be treated may be conducted into the sludge chamber by an inlet pipe 19 which has its discharge end preferably secured in an inlet opening 20 in the upper part of the front wall of the body by cementing the joint between the same or otherwise producing a tight fit therebetween. Near its upper end the partition is provided with a transfer opening 21 through which the liquid sewage flows from the sludge chamber into the effluent chamber. From the latter the harmless treated sewage is discharged to the soil or elsewhere or used for sub-irrigation by an outlet or discharge pipe 22 the inlet end of which is secured in an outlet opening 23 formed in the upper part of the rear wall, an air and water tight joint being preferably formed between these members by means of cement or otherwise.

The several openings 20, 21 and 23 in the front, intermediate and rear walls are preferably so arranged that the lowermost parts of the same are all on the same level, as shown in Fig. 1, so that the liquid will not rise above the lower parts of these openings and form air spaces in the upper parts of these openings above the liquid level.

In order to permit the action of the bacteria to be most effective, the upper part of the liquid in the sludge and effluent chambers should remain practically undisturbed, so that a bacterial mat is formed at the top of the liquid in these chambers. This is accomplished by providing means whereby the sewage is introduced into and withdrawn from the sludge and effluent chambers only in the lower parts of the same, leaving the upper parts of the liquid, and particularly the bacterial mat on the surface of the same, in a quiescent condition best suited to promote the action of the bacteria. For this purpose the liquid is conducted to the lower parts of the chambers and discharged from the same through liquid traps or guards. In the preferred form these traps comprise a plurality of upright conduits or legs 24, 25, 26, 27 each of which is constructed of concrete substantially in the form of a trough which is U-shaped in horizontal cross section and secured respectively in an upright position against the inner side of the front wall, opposite sides of the partition and the inner side of the rear wall. Each of these troughs has its channel or concave side facing the respective wall so that the upper part thereof extends over and communicates with the opening in the respective wall. The upper end of each trough is closed by a head 28 while its lower end is open so as to communicate with the lower part of the respective chamber. Various means may be employed for connecting these troughs with the respective walls but this is preferably accomplished by constructing each trough so that the same tapers downwardly and enlarges from its convex side toward its concave side in substantially the form of a dovetail and also providing the respective wall of the body with correspondingly undercut projections 29 forming dovetail seats 30 which receive the upright edge portions of the trough and interlock therewith so as to hold this trough reliably in its proper operative position. An air and water tight joint is produced between the opposing surfaces of each trough and the respective wall by means of cement or otherwise. Each of the troughs in the sludge chamber has its upper part preferably provided with a small vent opening 31 to prevent any siphonic action in the same and also avoid the formation of a compressed air cushion in the upper part of the sludge chamber which might interfere with the bacterial mat on the surface of the liquid therein and reduce the efficiency of the apparatus. The troughs in the effluent chamber are however completely sealed at the top so that the air space within the same above the surface of the liquid therein is sealed and cut off from communication with the outer atmosphere and light.

In the preferred installation of the apparatus the same is placed underground, as shown in Figs. 1, 2 and 3, but the same operates equally effective above ground.

In the operation of this apparatus the refuse or sewage consisting of water, liquid and solid matter from the kitchen, bath room and toilet of a dwelling or other source is delivered by the inlet pipe 19 into the upper part of the trap or conduit 24 which latter conducts the same to the lower part of the sludge chamber. The addition of sewage from time to time causes the same to rise gradually in the sludge chamber until a sufficient quantity has collected therein to raise its level to the opening 21, it being understood that as the level of the sewage rises the same enters and fills the lower parts of the traps 24, 25. After the sewage has once risen to this level the same remains constant and any additional sewage coming into the sludge chamber through the conduit 24 causes a corresponding quantity of sewage to flow from the sludge chamber through the conduit 25, opening 21, and conduit 25 into the lower part of the effluent chamber. While the sewage is flowing into the lower part of the sludge chamber through the inlet conduit 24 and out of the same through the conduit 25, the surface of the sewage in this chamber remains practically undisturbed, which causes a bacterial mat to be formed and maintained on top of the sewage in the sludge chamber. In this mat the enemy bacteria which are dangerous to health on account of their poisonous and disease breeding character develop very rapidly in vast numbers owing to the presence of air and either with or without light depending on the manner of mounting the apparatus and connecting the same with the source of sewage supply. While this mat is being formed and maintained, a constant conflict exists between the harmful and harmless bacteria during this time. While the refuse or sewage is in the sludge chamber the bacteria therein devours all the other germs including every vestige of paper, vegetable and animal and other solid matter contained in the sewage, so that the latter is converted into a clear liquid which is wholly free from solids. As this completely digested liquid sewage enters the effluent chamber and fills the latter up to the level of the openings 21, 23, another bacterial mat is formed on the surface thereof in which the bacteria develops. Owing to the total or nearly total absence of oxygen and also the absence of light in the upper part of the effluent chamber the harmful bacteria rapidly perish and their extermination is completed by the attack of the harmless bacteria which are capable of thriving under these conditions, thereby rendering the liquid sewage perfectly inert or neutral so far as any tendency to produce disease or contamination is concerned. As new liquid sewage enters the effluent chamber through the incoming trap 26 a corresponding amount passes through the trap 27 and outlet opening 23 into the outlet pipe 22 and discharge by porous drain tile into the soil which is to be irrigated or is otherwise disposed of. As the liquid enters and leaves the effluent chamber at the bottom owing to the traps 26, 27, the bacterial mat on the surface of the liquid therein is not disturbed, thereby promoting the rapid destruction of the harmful bacteria and the purification of the sewage, as well as rendering the same odorless. As the liquid flows from the sludge or inlet chamber to the effluent or outlet chamber and from the latter to the discharge pipe, no vacuum is produced in the sludge chamber on account of the vent holes in the top of the trap conduits 24, 25, and there is therefore no liability to siphon the liquid out of the sludge chamber.

It will therefore be apparent that by this apparatus sewage which otherwise would spread disease and produce unhealthy conditions if discharged upon the soil in the ordinary manner may now be rendered perfectly harmless, so that if the same should reach streams of water which are used for domestic purposes, the same would not be contaminated and endanger the health of persons drawing their water supply from the same. Owing to the fact that this apparatus converts all the sewage into a liquid, the same does not require agitation, addition of chemical nor frequent cleaning out, as is the case with ordinary cess pools which are disagreeable, dangerous, costly and unhealthy.

Furthermore, by forming the two chambers in one piece, all liability of disturbing the connection between the same is avoided, thus insuring its proper operation indefinitely.

Moreover, by constructing this apparatus of concrete the same is proof against the destructive action of the acids contained in the sewage and by making the chambers sufficiently large complete digestion of the sewage may be effected in the bacterial mat which must be of sufficient arc for this purpose.

When this apparatus is installed where running water is not available, as for instance in connection with the closet of a rural school house or railway station, the hollow body 32 of this closet may be arranged over the body of the treating apparatus so that the refuse is delivered into the top of the sludge chamber, as shown in Fig. 6, instead of through an opening in the front wall thereof. In this case a vent pipe 33 is preferably employed which opens at its lower end into the closet body in rear of the seat 34 and has its upper end extending to the external atmosphere and provided with a screen 35 to exclude flies. In other respects this apparatus may be constructed like that shown in Fig. 1. If sufficient water is not naturally supplied to the sludge chamber by rain from the roof of the building in which it is installed, or otherwise, then a quantity of water must be added to the sewage in the sludge chamber in order to promote the formation of bacteria.

I claim as my invention:

1. A sewage treating apparatus comprising a hollow body having a transverse wall provided with an opening in its upper part and seats which are undercut and converge downwardly on opposite sides of said opening, and an upright conduit which is of trough-shaped form in cross section and has its upright edges constructed of downwardly converging and dove tail form and engaging with said seats.

2. A sewage treating apparatus comprising a hollow body having front, intermediate and rear walls forming an inlet chamber and an outlet chamber, said intermediate wall being provided with a transfer opening and said rear wall being provided with an outlet opening and said front wall being provided with an inlet opening, a trap conduit arranged adjacent to said front wall and extending downwardly from the inlet opening therein, two trap conduits arranged on opposite sides of said intermediate wall and extending downwardly from the transfer opening therein, and a trap conduit arranged adjacent to the rear wall and extending downwardly from the outlet opening therein, the upper ends of the trap conduits within said inlet chamber being provided with vent openings, and the upper ends of the trap conduits in said outlet chamber being imperforate.

EDWARD F. OVERTON.